United States Patent
Zhu et al.

(10) Patent No.: US 12,532,305 B2
(45) Date of Patent: Jan. 20, 2026

(54) BEAM SWEEPING BASED ON A USER EQUIPMENT OPERATING STATE

(71) Applicant: QUALCOMM Incorporated, San Diego, CA (US)

(72) Inventors: Jun Zhu, San Diego, CA (US); Mihir Vijay Laghate, San Diego, CA (US); Raghu Narayan Challa, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 548 days.

(21) Appl. No.: 18/050,256

(22) Filed: Oct. 27, 2022

(65) Prior Publication Data

US 2024/0147449 A1    May 2, 2024

(51) Int. Cl.
    *H04W 72/044*    (2023.01)
(52) U.S. Cl.
    CPC .................. *H04W 72/046* (2013.01)
(58) Field of Classification Search
    CPC .... H04W 72/046; H04B 7/088; H04B 7/0695
    See application file for complete search history.

(56) References Cited

U.S. PATENT DOCUMENTS

| 10,998,956 | B1* | 5/2021 | Pal | H04B 7/088 |
| 2014/0253588 | A1* | 9/2014 | Mandala | G06F 3/011 |
| | | | | 345/633 |
| 2019/0037530 | A1 | 1/2019 | Han et al. | |
| 2019/0356439 | A1* | 11/2019 | Lee | H04B 7/0695 |
| 2020/0204237 | A1* | 6/2020 | Zhou | H04W 24/10 |
| 2020/0366360 | A1* | 11/2020 | Kotecha | H04J 11/0076 |
| 2020/0404644 | A1* | 12/2020 | Zhu | H04W 72/046 |
| 2021/0328639 | A1* | 10/2021 | Karakkad Kesavan Namboodiri | H04B 7/0695 |
| 2022/0029680 | A1 | 1/2022 | Zhou et al. | |
| 2023/0064052 | A1* | 3/2023 | Moon | H04B 17/318 |

OTHER PUBLICATIONS

International Search Report and Written Opinion—PCT/US2023/075214—ISA/EPO—Apr. 26, 2024.
Partial International Search Report—PCT/US2023/075214—ISA/EPO—Jan. 29, 2024.

* cited by examiner

*Primary Examiner* — Siu M Lee
(74) *Attorney, Agent, or Firm* — Harrity & Harrity, LLP

(57) ABSTRACT

Various aspects of the present disclosure generally relate to wireless communication. In some aspects, a user equipment (UE) may perform a beam sweeping procedure that selects a communication beam for communicating in a wireless network, the beam sweeping procedure being based at least in part on a beam sweeping subset of beams that is dynamically selected from a plurality of beams based at least in part on a current UE operating state. The UE may communicate in the wireless network based at least in part on the communication beam that is selected based at least in part on the beam sweeping procedure. Numerous other aspects are described.

30 Claims, 7 Drawing Sheets

BEAM SWEEPING BASED ON A USER EQUIPMENT OPERATING STATE

FIELD OF THE DISCLOSURE

Aspects of the present disclosure generally relate to wireless communication and to techniques and apparatuses for beam sweeping based on a user equipment operating state.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a user equipment (UE). The method may include performing a beam sweeping procedure that selects a communication beam for communicating in a wireless network, the beam sweeping procedure being based at least in part on a beam sweeping subset of beams that is dynamically selected from a plurality of beams based at least in part on a current UE operating state. The method may include communicating in the wireless network based at least in part on the communication beam that is selected based at least in part on the beam sweeping procedure.

Some aspects described herein relate to an apparatus for wireless communication at a UE. The apparatus may include a memory and one or more processors coupled to the memory. The one or more processors may be configured to perform a beam sweeping procedure that selects a communication beam for communicating in a wireless network, the beam sweeping procedure being based at least in part on a beam sweeping subset of beams that is dynamically selected from a plurality of beams based at least in part on a current UE operating state. The one or more processors may be configured to communicate in the wireless network based at least in part on the communication beam that is selected based at least in part on the beam sweeping procedure.

Some aspects described herein relate to a non-transitory computer-readable medium that stores a set of instructions for wireless communication by an apparatus at a UE. The set of instructions, when executed by one or more processors of the apparatus, may cause the apparatus to perform a beam sweeping procedure that selects a communication beam for communicating in a wireless network, the beam sweeping procedure being based at least in part on a beam sweeping subset of beams that is dynamically selected from a plurality of beams based at least in part on a current UE operating state. The set of instructions, when executed by one or more processors of the apparatus, may cause the apparatus to communicate in the wireless network based at least in part on the communication beam that is selected based at least in part on the beam sweeping procedure.

Some aspects described herein relate to an apparatus for wireless communication. The apparatus may include means for performing a beam sweeping procedure that selects a communication beam for communicating in a wireless network, the beam sweeping procedure being based at least in part on a beam sweeping subset of beams that is dynamically selected from a plurality of beams based at least in part on a current UE operating state. The apparatus may include means for communicating in the wireless network based at least in part on the communication beam that is selected based at least in part on the beam sweeping procedure.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
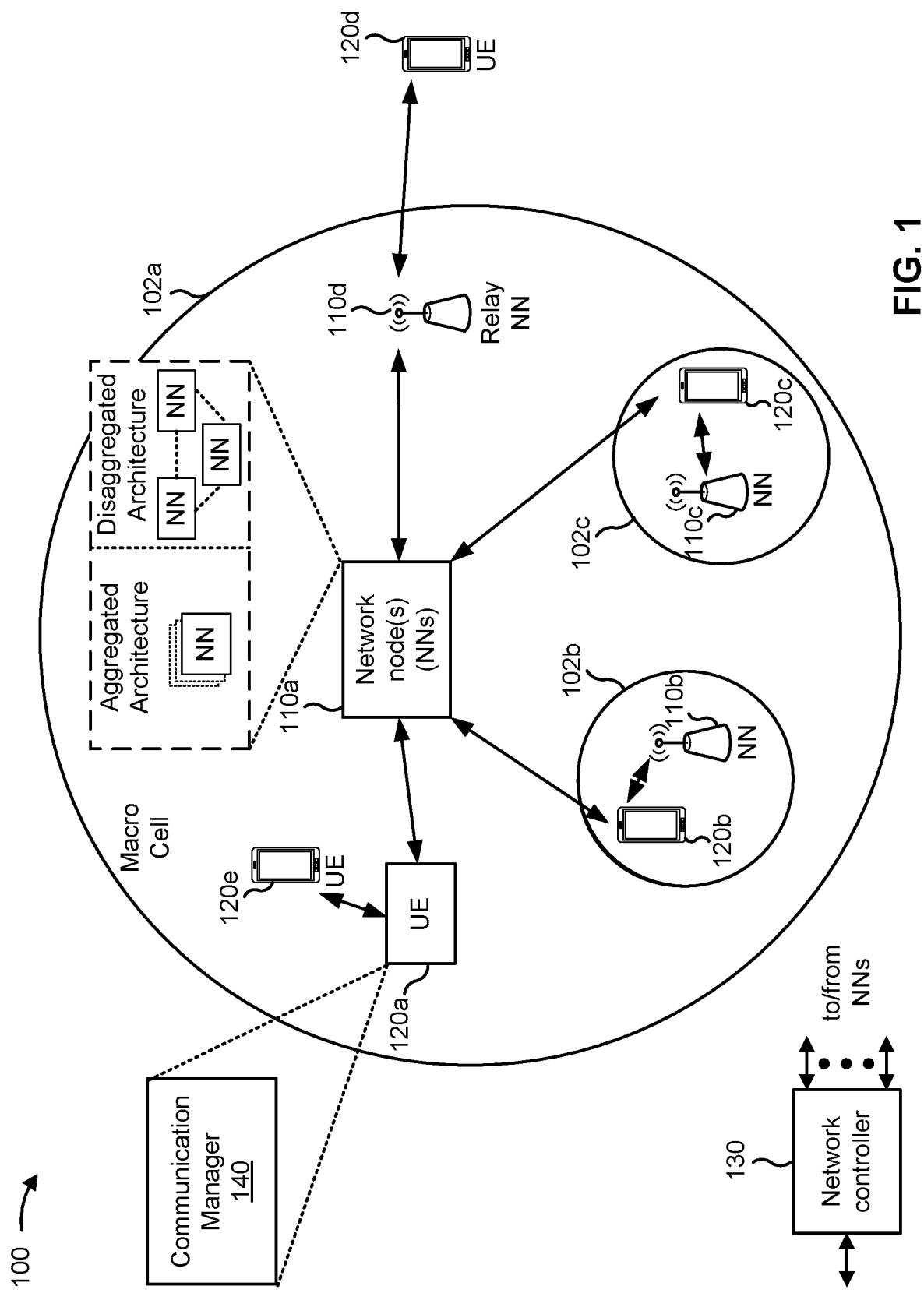
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may perform a beam sweeping procedure that selects a communication beam for communicating in a wireless network, the beam sweeping procedure being based at least in part on a beam sweeping subset of beams that is dynamically selected from a plurality of beams based at least in part on a current UE operating state; and communicate in the wireless network based at least in part on the communication beam that is selected based at least in part on the beam sweeping procedure. Additionally, or alternatively, the communication manager 140 may perform one or more other operations described herein.

As indicated above, FIG. 1 is provided as an example. Other examples may differ from what is described with regard to FIG. 1.

Figure 2:
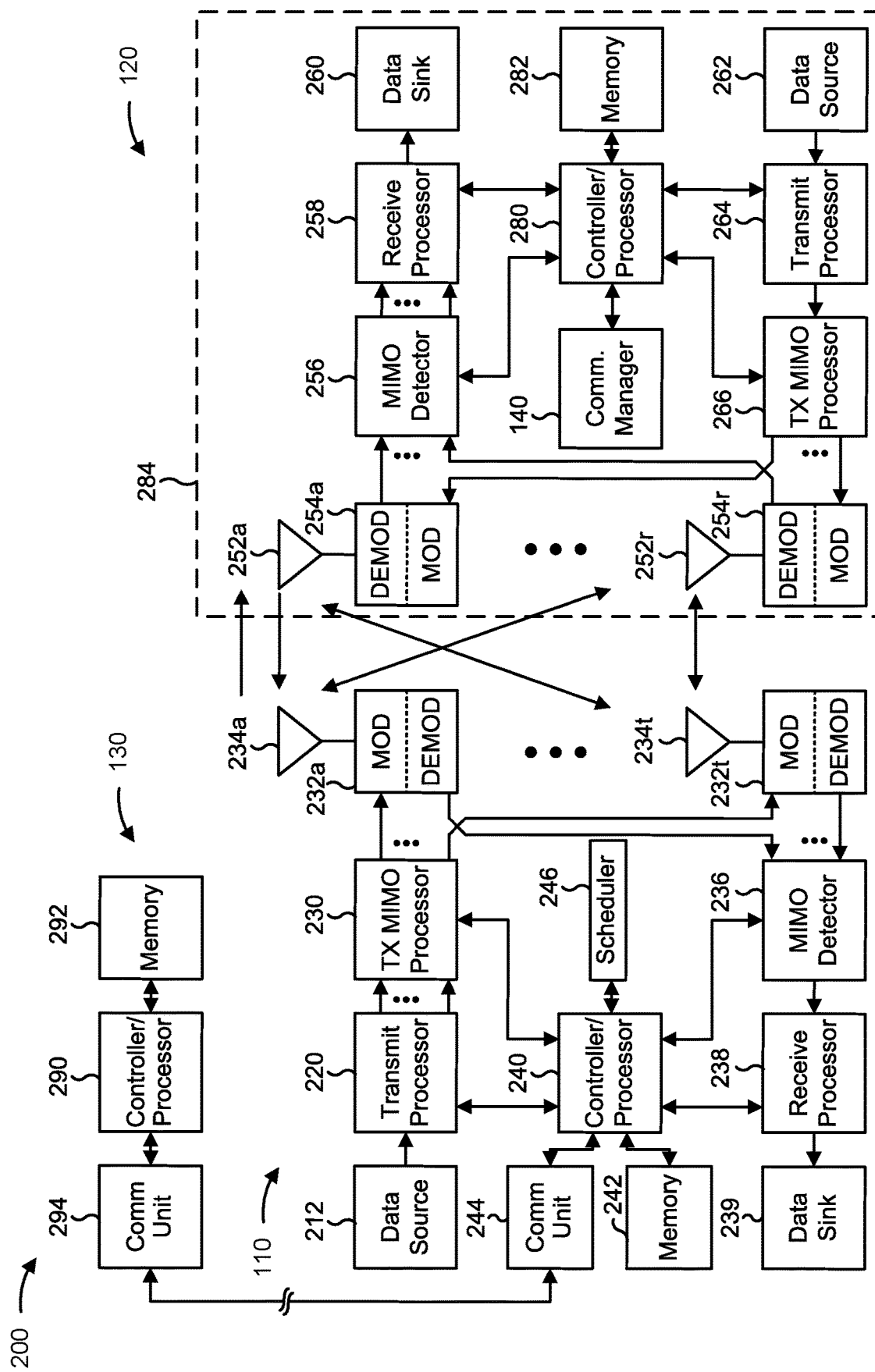
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-7).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-7).

Figure 6:
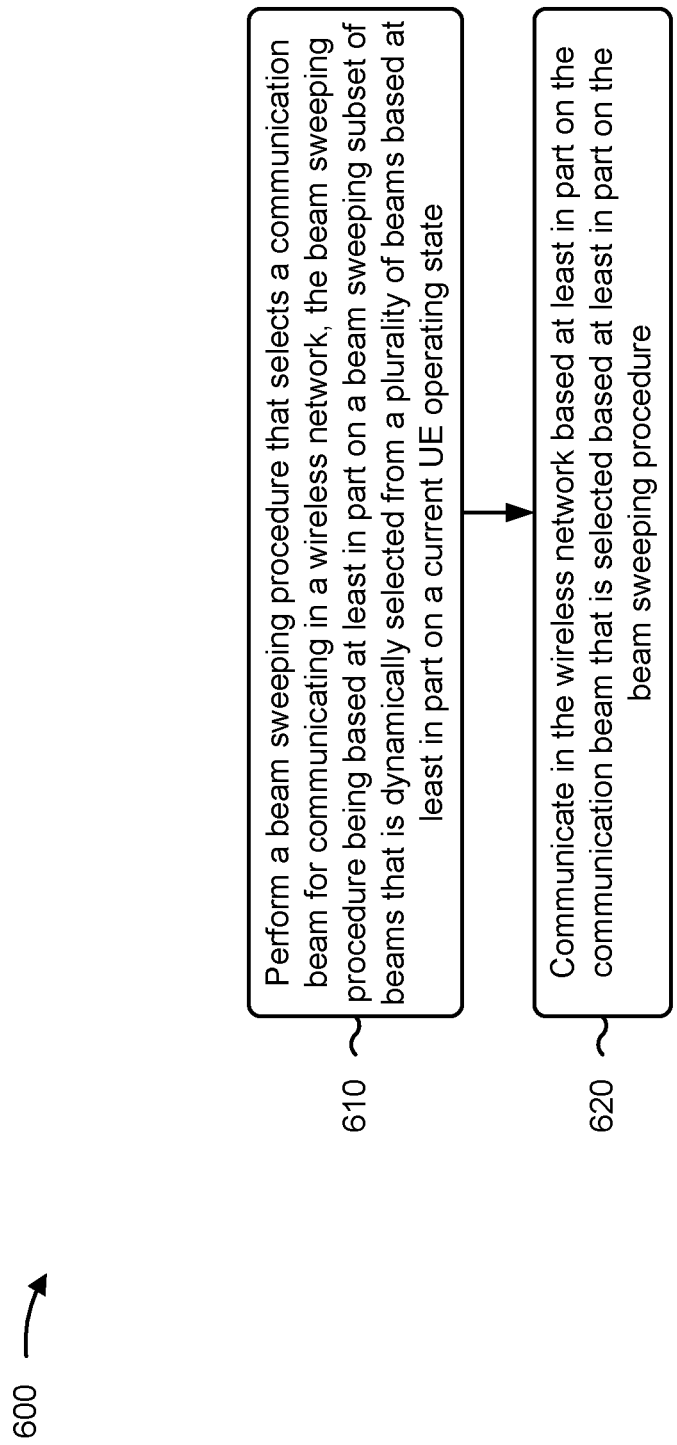
FIG. 6 is a diagram illustrating an example process performed, for example, by a UE, in accordance with the present disclosure.

The controller/processor 240 of the network node 110, the controller/processor 280 of the UE 120, and/or any other component(s) of FIG. 2 may perform one or more techniques associated with beam sweeping based on a user equipment operating state, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting)

by one or more processors of the network node 110 and/or the UE 120, may cause the one or more processors, the UE 120, and/or the network node 110 to perform or direct operations of, for example, process 600 of FIG. 6, and/or other processes as described herein. In some examples, executing instructions may include running the instructions, converting the instructions, compiling the instructions, and/or interpreting the instructions, among other examples.

In some aspects, a UE (e.g., the UE 120) includes means for performing a beam sweeping procedure that selects a communication beam for communicating in a wireless network, the beam sweeping procedure being based at least in part on a beam sweeping subset of beams that is dynamically selected from a plurality of beams based at least in part on a current UE operating state; and/or means for communicating in the wireless network based at least in part on the communication beam that is selected based at least in part on the beam sweeping procedure. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
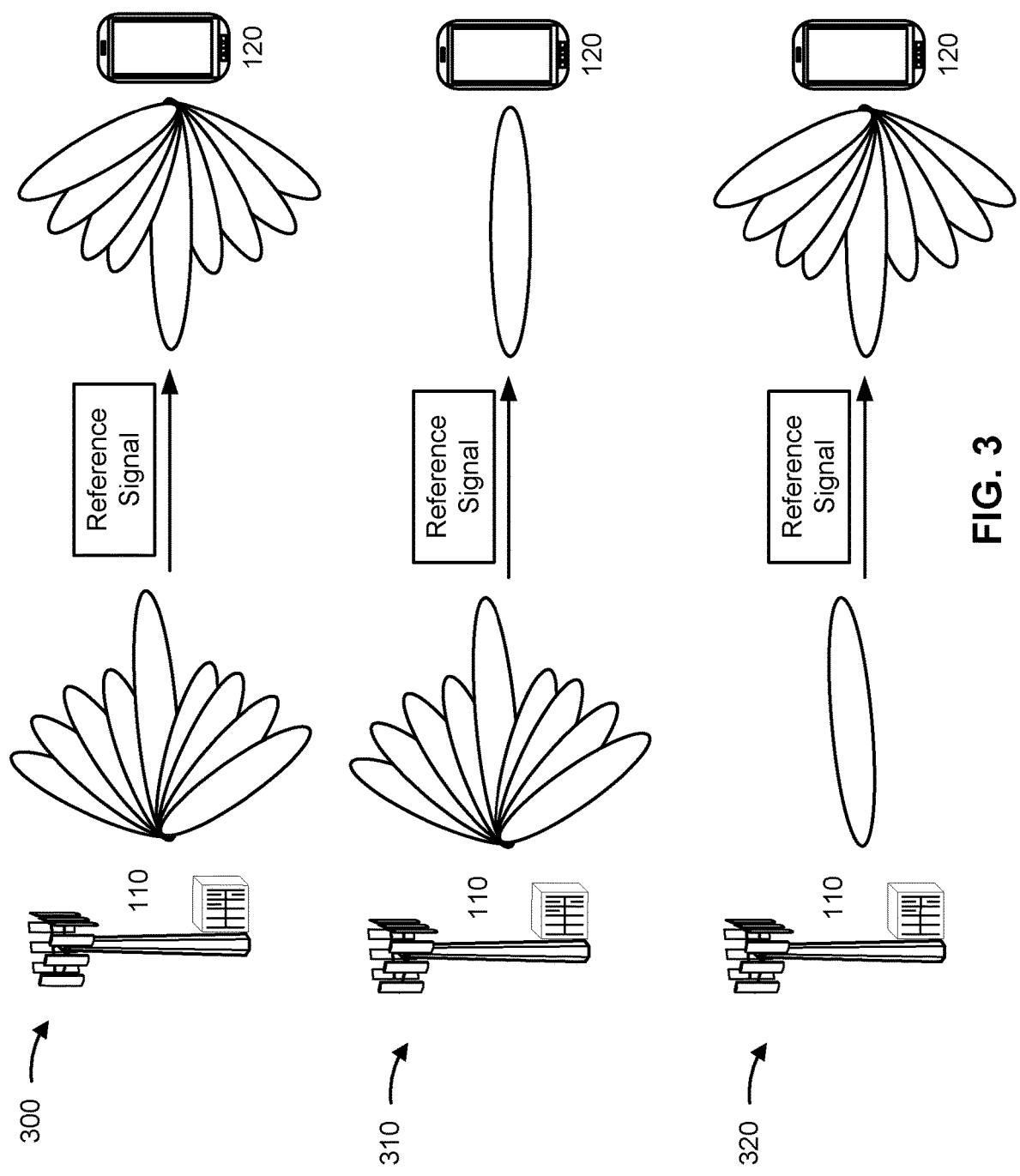
FIG. 3 is a diagram illustrating examples of beam management procedures, in accordance with the present disclosure.

FIG. 3 is a diagram illustrating examples 300, 310, and 320 of beam management procedures, in accordance with the present disclosure. As shown in FIG. 3, examples 300, 310, and 320 include a UE 120 in communication with a network node 110 in a wireless network (e.g., wireless network 100). However, the devices shown in FIG. 3 are provided as examples, and the wireless network may support communication and beam management between other devices (e.g., between a UE 120 and a network node 110 or TRP, between a mobile termination node and a control node, between an IAB child node and an IAB parent node, and/or between a scheduled node and a scheduling node). In some aspects, the UE 120 and the network node 110 may be in a connected state (e.g., a radio resource control (RRC) connected state).

As shown in FIG. 3, example 300 may include a network node 110 (e.g., one or more network node devices such as an RU, a DU, and/or a CU, among other examples) and a UE 120 communicating to perform beam management using one or more reference signals, such as a channel state information reference signal (CSI-RS) and/or a synchronization signal block (SSB). Example 300 depicts a first beam management procedure that may be referred to as a beam selection procedure, an initial beam acquisition procedure, a beam sweeping procedure, a cell search procedure, and/or a beam search procedure. As shown in FIG. 3 and example 300, the network node 110 may transmit one or more reference signals to the UE 120. The network node 110 may indicate a configuration of the reference signal to the UE 120, such as by indicating a periodic reference signal configuration (e.g., using RRC signaling), a semi-persistent reference signal configuration (e.g., using media access control (MAC) control element (CE) signaling), and/or an aperiodic reference signal configuration (e.g., using downlink control information (DCI)). Other examples of beam management procedures may include uplink beam management procedures that use sounding reference signals (SRS) transmitted by the UE 120, such as a U1 beam management procedure (e.g., an initial selection of an uplink beam by a network entity or the UE), a U2 beam management procedure (e.g., a refinement of the uplink beam by the network entity), and/or a U3 beam management procedure (e.g., a refinement of the uplink beam by the UE).

The first beam management procedure may include the network node 110 performing beam sweeping over multiple transmit (Tx) beams. "Beam sweeping" may denote the transmission and/or reception of one or more wireless signals (e.g., a reference signal) based at least in part on transmission beams with different spatial directions and/or spatial widths. To illustrate, the network node 110 may transmit a reference signal using a first transmit beam associated with a first spatial direction and/or spatial width for a first time duration and then transmit a same reference signal and/or a different reference signal using a second transmit beam associated with a second spatial direction and/or second spatial width for a second time duration. In some aspects, the network node 110 may sequentially transmit beams with a different spatial direction and/or spatial width at different time durations (e.g., sweep through transmitting each beam included in a list of beams one at a time). Accordingly, the network node 110 may transmit a reference signal using one or more transmit beams for beam management.

To enable the UE 120 to perform receive (Rx) beam sweeping, the network node may use a transmit beam to transmit (e.g., with repetitions) each reference signal (RS) at multiple times within the same RS resource set so that the UE 120 may sweep through receive beams in multiple transmission instances. For example, if the network node 110 has a set of N transmit beams and the UE 120 has a set of M receive beams (e.g., where N and M are integers), the reference signal may be transmitted on each of the N transmit beams M times so that the UE 120 may receive M instances of the reference signal per transmit beam. That is, for each transmit beam of the network node 110, the UE 120 may perform beam sweeping through the receive beams of the UE 120. In some aspects, the UE 120 may perform the beam sweeping based at least in part on a beam codebook that indicates a list of beams to use as part of the beam sweeping (e.g., a list of receive beams and/or a list of transmit beams). As a result, the first beam management procedure may enable the UE 120 to measure a reference signal on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120.

As shown in FIG. 3, example 310 may include a network node 110 and a UE 120 communicating to perform beam management using one or more reference signals. Example 310 depicts a second beam management procedure that may be referred to as a beam refinement procedure, a network node beam refinement procedure, a TRP beam refinement procedure, and/or a transmit beam refinement procedure. As shown in FIG. 3 and example 310, the reference signal(s) used as part of the second beam management procedure may be configured as one or more downlink reference signal(s) that are transmitted from the network node 110 to the UE 120. The reference signals may be configured as aperiodic reference signals (e.g., using DCI).

The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a reference signal using each transmit beam of the one or more transmit beams for beam management. The UE 120 may measure each reference signal using a single (e.g., a same) receive beam (e.g., determined based at least in part on measurements performed in connection with the first beam management procedure). The second beam management procedure may enable the network node 110 to select a best transmit beam based at least in part on one or more measurements of the reference signal (e.g., measured by the UE 120 using the single receive beam) reported by the UE 120.

As shown in FIG. 3, example 320 depicts a third beam management procedure that may be referred to as a beam refinement procedure, a UE beam refinement procedure, and/or a receive beam refinement procedure. As shown in FIG. 3 and example 320, one or more reference signals may be configured as downlink reference signals that are transmitted from the network node 110 to the UE 120. The reference signal(s) may be configured to be aperiodic (e.g., using DCI). The third beam management process may include the network node 110 transmitting the one or more reference signals using a single transmit beam (e.g., determined based at least in part on measurements reported by the UE 120 in connection with the first beam management procedure and/or the second beam management procedure). To enable the UE 120 to perform receive beam sweeping, the network node may use a transmit beam to transmit (e.g., with repetitions) a reference signal at multiple times within the same RS resource set so that UE 120 can sweep through one or more receive beams in multiple transmission instances. In some aspects, the UE 120 may select the receive beams based at least in part on a beam codebook that specifies a list of beams. Alternatively or additionally, the UE may select a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the reference signal of the transmit beam using the one or more receive beams). Accordingly, a beam management procedure (e.g., the first beam management procedure, the second beam management procedure, and/or the third beam management procedure) may enable the network node 110 and/or the UE 120 to select a transmission and/or reception beam with higher signal quality relative to other beams. The beam associated with the higher signal quality may enable the network node 110 and the UE 120 to satisfy a link budget.

As indicated above, FIG. 3 is provided as an example of beam management procedures. Other examples of beam management procedures may differ from what is described with respect to FIG. 3. For example, the UE 120 and the network node 110 may perform the third beam management procedure before performing the second beam management procedure, and/or the UE 120 and the network node 110 may perform a similar beam management procedure to select a UE transmit beam.

Figure 4:
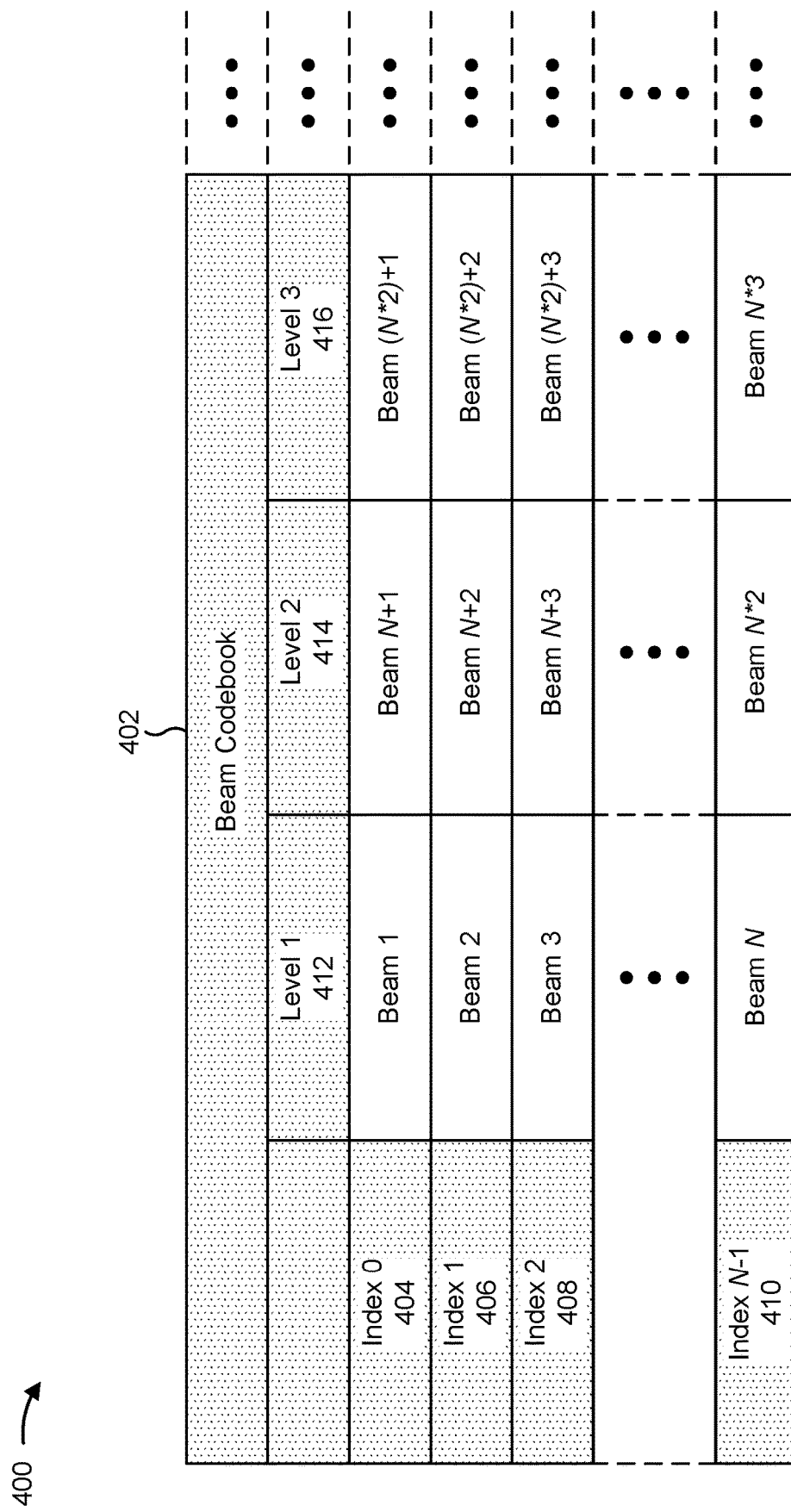
FIG. 4 is a diagram illustrating an example of a beam codebook, in accordance with the present disclosure.

FIG. 4 is a diagram illustrating an example 400 of a beam codebook, in accordance with the present disclosure.

A codebook may provide information about a data set that enables a device to decode the data set. For example, a codebook may provide information about a structure of the data set (e.g., one or more fields included in the data set and/or a length of each field), one or more data variables, one or more data identifiers and/or labels, one or more data generation formulas, one or more signal metrics, and/or one or more units of measure. The example 400 includes a beam codebook 402 that provides information about a set of beams. The beam codebook 402 shown by the example 400 has been simplified for visual clarity, and other examples of a beam codebook may include alternate or additional information.

In some aspects, the beam codebook 402 may indicate a variety of information about each beam included in a set of beams, such a spatial information (e.g., a beam width and/or a beam direction) and/or beam relationship information (e.g., how a first beam relates to a second beam). As one example, the beam codebook 402 may be associated with a set of beams that are supported by UE hardware. As shown by the example 400, the beam codebook 402 may partition the set of beams into one or more spatial groupings based at least in part on a transmission direction associated with each beam. That is, each beam within a spatial grouping of beams may have a commensurate line-of-sight (LoS) transmission direction (e.g., each beam LoS transmission direction is within a range of values and/or within a threshold of other beams within the spatial grouping). Alternatively or additionally, the beam codebook 402 may indicate a beam hierarchy of each beam within a subset of beams.

To illustrate, the beam codebook 402 may partition the set of beams into N subsets, where N is an integer. A first codebook index 404 (shown as Index 0) may map to a first subset of beams that are shown in a first horizontal row of the beam codebook 402, a second codebook index 406 (shown as Index 1) may map to a second subset of beams that are shown in a second horizontal row of the beam codebook 402, and a third codebook index 408 (shown as Index 2) may map to a third subset of beams that are shown in a third horizontal row of the beam codebook 402. As shown by the example 400, an (N−1)-th codebook index 410 (shown as Index N−1) may map to an N-th subset of beams that are shown in a bottom horizontal row of the beam codebook 402. In some aspects, the beam codebook 402 may group and/or index the subset of beams based at least in part on a spatial relationship. For example, the entirety of the set of beams associated with the beam codebook 402 may collectively have a 360-degree horizontal coverage area, and the beam codebook 402 may partition each subset of beams based at least in part on an LoS transmission direction that is an integer multiple of 360/N. That is, the first subset of beams may be associated with a first horizontal LoS transmission direction of 0 degrees, the second subset of beams may be associated with a second horizontal LoS transmission direction of 360/N degrees, the third subset of beams may be associated with a third horizontal LoS transmission direction of (360/N)*2 degrees, up to the N-th subset of beams being associated with an N-th LoS transmission direction of (360/N)*(N−1) degrees. While described as a horizontal LoS transmission direction, other examples may alternatively or additionally be based at least in part on other measures of a transmission direction, such as a vertical LoS transmission direction and/or a vector-based LoS transmission direction.

In some aspects, the beam codebook 402 may index the subset of beams based at least in part on assigning subset of beams with adjacent LoS transmission directions consecutive index values. To illustrate, the beam codebook 402 may assign the second subset of beams a codebook index (e.g., the second codebook index 406) that is consecutive to the first codebook index 404 based at least in part on the second subset of beams having an adjacent LoS transmission direction to the first subset of beams (e.g., based at least in part on the 360/N partitioning). Adjacent subset of beams and/or beams within the subsets may be alternatively referred to as neighboring subsets of beams (and/or neighboring beams). Thus, the second subset of beams indicated by the second codebook index 406 may be referred to as a neighboring subset of beams to the first subset of beams (e.g., indicated by the first codebook index 404) and the third subset of beams (e.g., indicated by the third codebook index 408). Alternatively or additionally, individual beams may be referred to as neighboring beams. To illustrate, a first individual beam within the second subset of beams (e.g., Beam 2) may be referred to as a neighboring beam to a second individual beam within the first subset of beams (e.g., Beam 1) and/or a third individual beam within the third subset (e.g., Beam 3) based at least in part on each beam being in a neighboring subset and each beam having a common hierarchy as further described.

In some aspects, the beam codebook 402 may indicate a beam hierarchy of the beams within a subset of beams that is based at least in part on a spatial width of each beam. For example, the beam codebook 402 may indicate that a first beam in the first subset of beams (shown as Beam 1) that has a maximum spatial width is assigned a "level 1" hierarchy as shown by reference number 412. The beam codebook 402 may indicate that a second beam in the first subset of beams (shown as Beam N+1) with the next widest spatial width (e.g., relative to the first beam) is assigned a "level 2" hierarchy as shown by reference number 414 and a third beam in the first subset of beams (shown as Beam (N*2)+1) with the next widest spatial width (e.g., relative to the second beam) is assigned a "level 3" hierarchy as shown by reference number 416. Accordingly, a lower number value in the beam hierarchy may indicate a wider beam width and/or a higher hierarchy level. A higher number value in the beam hierarchy may indicate a narrower beam width and/or a lower hierarchy level. For instance, and as shown by the example 400, Beam 1 has a wider beam width and higher hierarchy level relative to Beam N+1 and Beam (N*2)+1. Beam N+1 has a wider beam width and higher hierarchy level relative to Beam (N*2)+1, but a narrower beam width and lower hierarchy level relative to Beam 1. Beam (N*2)+1 has a narrower beam width and lower hierarchy level relative to Beam 1 and Beam N+1.

A "parent beam" in a beam hierarchy may denote a beam that has a beam hierarchy adjacent to, and higher than, another beam and, subsequently, a wider beam width. For instance, Beam 1 may be referred to as a parent beam of Beam N+1 based at least in part on Beam 1 having a beam hierarchy (e.g., Level 1) that is adjacent to and above Beam N+1 (e.g., with a Level 2 beam hierarchy). Alternatively or additionally, Beam N+1 may be referred to as a "child beam" of Beam 1 based at least in part on having a beam hierarchy that is adjacent to, and lower than, the beam hierarchy of Beam 1. Based at least in part on Beam 1 and Beam N+1 being grouped in a same subset of beams and having commensurate LoS transmission directions, Beam 1 may include Beam N+1 insofar as a first transmission coverage area associated with Beam 1 may encompass a second transmission coverage area associated with Beam N+1. Beam N+1 may be referred to as a parent beam of Beam (N*2)+1, and Beam (N*2)+1 may be referred to as a child beam of Beam N+1. While the example 400 shows a single child beam being related to a parent beam, other examples may include multiple child beams that are related to a same parent beam.

A first beam in a first subset of beams may be considered a neighbor beam of a second beam in a second subset of beams based at least in part on the beams having a same beam hierarchy and being in adjacent subsets of beams (e.g., having adjacent LoS transmission directions). To illustrate, and with regard to the Level 1 beam hierarchy as shown by the reference number 412, Beam 1 in the first subset of beams may be considered a neighbor of Beam 2 and Beam N, and Beam 2 may be considered a neighbor of both Beam 1 and Beam 3. As another example, Beam N+2 in the second subset of beams may be considered a neighbor of Beam N+3 in the third subset of beams and Beam N+1 in the first subset of beams. However, Beam N+1 may not be considered a neighbor of Beam N+3 based at least in part on the beams being in non-adjacent subsets.

As described above, a UE (e.g., the UE 120) may perform a beam management procedure based at least in part on a beam codebook (e.g., a UE beam codebook). For example, the UE may scan each beam indicated by the beam codebook using a round robin procedure in which the UE scans each beam in succession for equal time durations. However, scanning each beam may introduce a time delay that is disproportionate to a benefit of scanning each beam. To illustrate, some receive beams may be associated with a LoS direction that is orthogonal to a transmission source direction. As another example, the UE may scan a static subset of beams that result in the UE selecting a beam that has higher signal quality within the subset of beams (e.g., a local maxima within the subset) but fails to have the highest signal quality within the entirety of the set of beams indicated by the beam codebook. To illustrate, the UE may perform a beam management procedure based at least in part on a static subset of beams (e.g., a static number of beams and/or a static combination of beams) in a presence of a signal blockage at an antenna. However, the static subset of beams may be based at least in part on a primary beam (e.g., a beam with the highest signal quality relative to other beams) that was selected in the absence of the signal blockage. To illustrate, the static combination of beams may be a static list that specifies selecting a beam based at least in part on a beam relationship and/or a beam hierarchy relative to the primary beam (e.g., the beam relationship and/or the beam hierarchy remains static). In such a scenario, the UE may select a first beam from the static subset of beams that is a local maxima selection (e.g., instead of an optimal selection from an entirety of available beams) that results in reduced signal quality relative to a second beam from the set of beams indicated by the beam codebook. The reduced signal quality may result in increased recovery errors, reduced data throughput, and/or increased data transfer latencies.

Some techniques and apparatuses described herein provide beam sweeping based on a user equipment operating state. In some aspects, a UE may perform a beam sweeping procedure that selects a communication beam for communicating in a wireless network. As part of performing the beam sweeping procedure, the UE may dynamically select a beam sweeping subset of beams from a plurality of beams based at least in part on a current UE operating state. In some aspects, selecting the beam sweeping subset of beams may include selecting a number of beams to include in the beam sweeping subset of beams based at least in part on the current UE operating state, such as selecting more beams for a first UE operating state and fewer beams for a second UE operating state. Alternatively or additionally, selecting the beam sweeping subset of beams may include selecting the beams to include in the beam sweeping subset of beams based at least in part on one or more sub-lists of beams and/or a beam hierarchy. The UE may communicate in the wireless network based at least in part on using the communication beam that is selected using the beam sweeping procedure.

By dynamically selecting beams that are used in a beam sweeping procedure based at least in part on a current UE operating state, a UE may dynamically change a number of beams and/or a combination of beams in a beam sweeping subset of beams and improve a beam management procedure. For example, the UE may select fewer beams (e.g., relative to the static number of beams) and reduce a delay associated with performing a beam management procedure based at least in part on identifying that the beam management procedure may be performed more frequently based at least in part on a UE changing locations rapidly. Alternatively or additionally, the UE may change a combination of beams that enables the UE to select an optimal beam from an entirety of available beams instead of a local maxima beam from a static list of beams based at least in part on identifying that a UE is stationary and a beam management procedure may be performed less frequently. Dynamically changing a subset of beams based on a UE operating state may enable the UE to optimize a tradeoff between reducing delay associated with performing a beam sweeping procedure and improving a signal quality associated with a selected beam. Optimizing the tradeoff may further reduce recovery errors, improve data throughput, and/or reduce data transfer latencies.

As indicated above, FIG. 4 is provided as an example. Other examples may differ from what is described with regard to FIG. 4.

Figure 5:
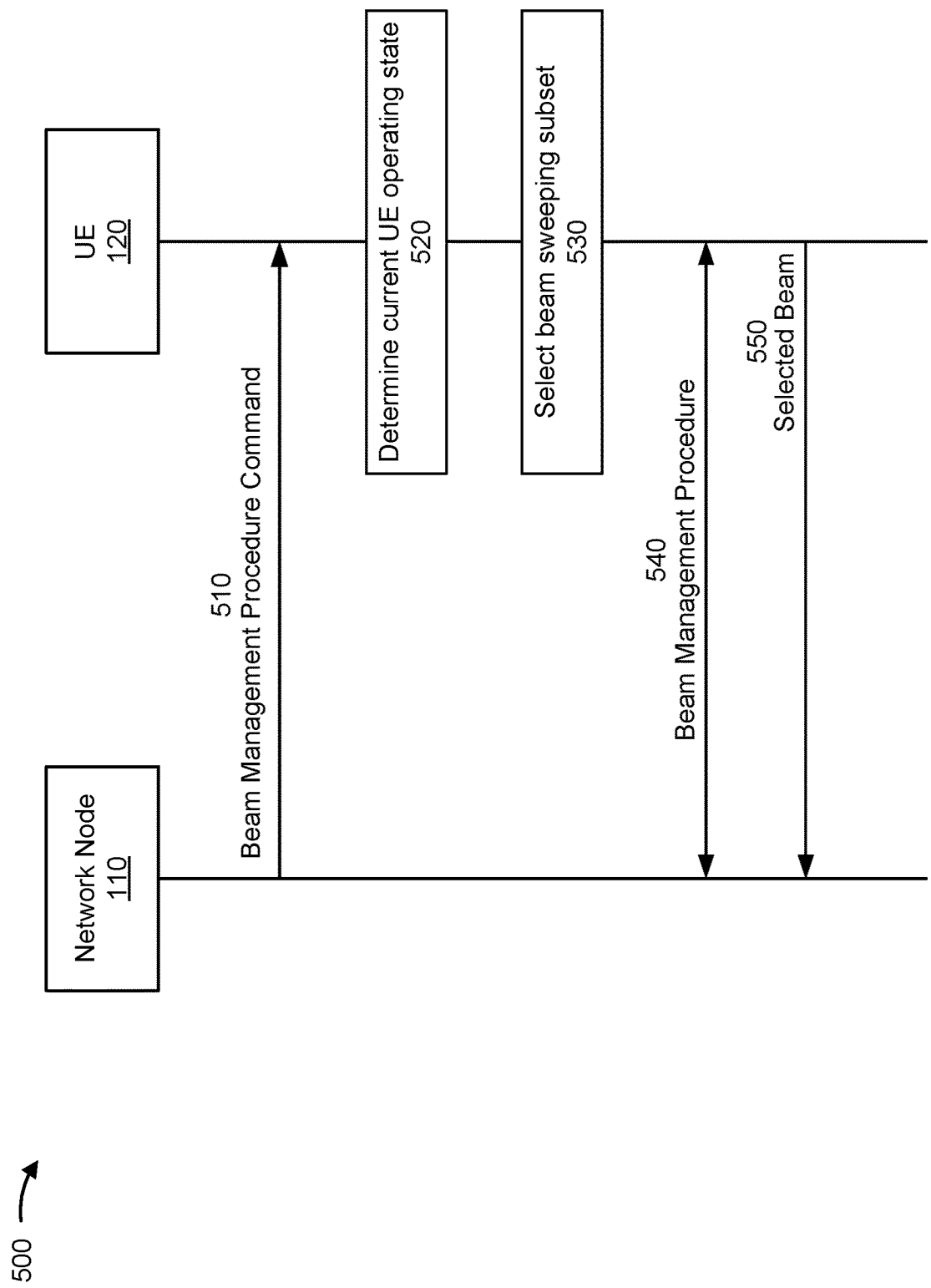
FIG. 5 is a diagram illustrating an example of a wireless communication process between a network node and a UE, in accordance with the present disclosure.

FIG. 5 is a diagram illustrating an example 500 of a wireless communication process between a network node (e.g., the network node 110) and a UE (e.g., the UE 120), in accordance with the present disclosure.

As shown by reference number 510, a network node 110 may transmit, and a UE 120 may receive, a beam management procedure command. For instance, the network node 110 may generate a first signal metric based at least in part on an uplink signal from the UE 120 and/or receive a second signal metric from the UE 120 that is based at least in part on a downlink communication from the network node 110. The first signal metric and/or the second signal metric may indicate that a signal quality associated with a beam used by the network node 110 and/or the UE 120 to communicate has fallen below a quality threshold, and the network node may determine to initiate a beam management procedure.

As one example, the network node may transmit any combination of an RRC message, a MAC CE, and/or DCI that indicates to perform a beam management procedure (e.g., the first beam management procedure, the second beam management procedure, and/or the third beam management procedure as described with regard to FIG. 3). Alternatively or additionally, the network node 110 may indicate a configuration associated with the beam management procedure, such as a reference signal configuration (e.g., an air interface resources, a port, and/or a periodicity), a type of measurement to perform, a beam management procedure start time, a beam management procedure stop time, and/or a reporting configuration. However, in other examples, the network node 110 may refrain from transmitting a beam management procedure command, and transmit an indication of one or more occurrences of a reference signal in a broadcast message.

As shown by reference number 520, the UE 120 may determine a current UE operating state. For example, the UE 120 may determine any combination of a UE motion state (e.g., a fast motion state, a slow motion state, and/or a stationary state), a Doppler factor, and/or a beam dwell time. To illustrate, the UE 120 may determine a current speed and/or velocity of the UE based at least in part on a global navigation satellite system (GNSS) receiver to track location changes. In some aspects, the UE 120 may identify a current UE motion state based at least in part on one or more thresholds, such as a stationary threshold that indicates the UE is stationary, a slow motion threshold that indicates the UE is moving at a slow rate, and/or a fast motion threshold that indicates the UE is moving at a fast rate. For instance, the UE 120 may determine that the UE is currently operating in a stationary state based at least in part on identifying that a current UE velocity (e.g., determined based at least in part on a GNSS receiver) satisfies the stationary threshold (e.g., the UE velocity is below or at the stationary threshold). As another example, the UE 120 may determine that the UE is currently operating in a slow motion state based at least in part on determining that the current UE velocity satisfies the slow motion threshold (e.g., the UE velocity is above the stationary threshold and/or is at or above slow motion threshold). In some scenarios, the UE 120 may determine that the UE is currently operating in a fast motion state based at least in part on determining that the current UE velocity satisfies the fast motion threshold (e.g., the UE velocity is above the slow motion threshold and/or is at or above the fast motion threshold). Accordingly, the stationary threshold, the slow motion threshold, and the fast motion threshold may indicate different speeds and/or velocities. The values assigned to each motion threshold may be indicated to the UE 120 by the network node 110 (e.g., in RRC signaling) and/or may be statically stored at the UE 120.

As another example, a Doppler factor may indicate a motion of the UE 120 relative to the network node 110. To illustrate, the UE 120 may measure a Doppler frequency based at least in part on a downlink reference signal from the network node 110. In some aspects, the UE 120 may determine, as a UE operating state, whether there is high relative change in motion (e.g., between the UE and network node), low relative change in motion, and/or minimal-to-no relative change in motion. A high Doppler frequency and/or a rapid change between Doppler frequencies may indicate more relative change in motion, and a low Doppler frequency may indicate less relative change in motion. Accordingly, the UE 120 may determine a current UE operating state based at least in part on a first Doppler threshold that indicates high relative change in motion, a second Doppler threshold that indicates low relative change in motion, and/or a third Doppler threshold that indicates minimal-to-no relative change in motion. The values assigned to each Doppler threshold may be indicated to the UE 120 by the network node 110 (e.g., in RRC signaling) and/or may be statically stored at the UE 120.

"Beam dwell time" may denote an amount of time the UE 120 uses a particular beam as a primary beam (e.g., without switching to another beam) for communication with the network node 110. A long beam dwell time may indicate that the UE 120 uses a same beam and, accordingly, may be in a stationary state. A short beam dwell time may indicate that the UE 120 may change the primary beam more rapidly (e.g., relative to the long beam dwell time) and indicate a that the UE 120 is operating in a slow motion and/or a fast motion state. Accordingly, the UE 120 may determine a current UE operating state based at least in part on a first dwell time threshold that indicates a fast motion state, a second dwell time threshold that indicates a slow motion state, and/or a third dwell time threshold that indicates a stationary state. The values assigned to each dwell time threshold may be indicated to the UE 120 by the network node 110 (e.g., in RRC signaling) and/or may be statically stored at the UE 120.

As shown by reference number 530, the UE 120 may select a beam sweeping subset of beams to use for the beam management procedure. To illustrate, the UE 120 may select beams that are used as part of a beam sweeping procedure included in the beam management procedure. In some aspects, the UE 120 may select the beam sweeping subset of beams based at least in part on the current UE operating state. For instance, the UE 120 may select the beam sweeping subset of beams from multiple beams indicated in a UE beam codebook, such as that described with regard to FIG. 4. In selecting the beam sweeping subset of beams, the UE may dynamically select a number of beams (e.g., more beams or fewer beams) included in the beam sweeping subset of beams, such as by selecting more beams based at least in part on a current UE operating state indicating that the UE is operating in a stationary state and fewer beams based at least in part on the current UE operation state indicating that the UE is operating in a fast motion state. To illustrate, a fast motion state may indicate that a beam selected as a primary beam at a first point in time (e.g., based at least in part on the best signal quality) may not be applicable for a second point in time based at least in part on the UE moving locations. That is, sweeping through more beams may increase a time associated with the beam management procedure with less benefit based at least in part on the UE moving locations more quickly when operating in a fast motion state (e.g., the beam with the best signal quality may change more rapidly based on the UE moving locations). The increased time associated with using more beams may provide more benefit to a UE operating in a stationary state based at least in part on the UE location not changing (e.g., the beam with the best signal quality may be less likely to change).

As one example, the multiple beams indicated in the UE beam codebook may be partitioned into one or more spatial groupings of beams as further described with regard to FIG. 4. The UE 120 may select the beam sweeping subset of beams based at least in part on the current UE operating state and the one or more spatial groupings of beams, such as by selecting a number of beams that are spatially related to a primary beam. As one example, the UE 120 may receive multiple different reference signals (e.g., SSBs), and select a respective primary beam for each reference signal based at least in part on a signal metric indicating that the respective primary beam has a higher signal quality relative to other beams. In some aspects, for each primary beam, the UE 120 may select a respective beam sweeping subset of beams based at least in part on the respective primary beam. That is, the UE 120 may select multiple beam sweeping subsets of beams, and each beam sweeping subset of beams may be based at least in part on the respective primary beam associated with the respective reference signal.

As further described with regard to FIG. 4, a primary beam selected by the UE 120 may be associated with a baseline beam hierarchy level (e.g., Level 1, Level 2, and/or Level 3) within a spatial grouping of beams. In some aspects, the UE 120 may select the beam sweeping subset of beams associated with the primary beam based at least in part on the baseline beam hierarchy level and one or more sub-lists of beams. That is, in addition to the spatial groupings indicated by the UE beam codebook, the UE 120 may partition the multiple beams into one or more sub-lists that are based at least in part on beam hierarchy relationships and/or spatial relationships. To illustrate, an example first sub-list of beams may include a primary beam associated with a respective reference signal and/or other primary beams associated with other reference signals. An example second sub-list of beams may include a parent level beam associated with the respective primary beam, each neighbor level beam associated with the respective primary beam, and each child level beam associated with the respective primary beam.

Alternatively or additionally, the second sub-list of beams may include the parent level beam, each neighbor level beam, and each child level beam associated with the other primary beams associated with the other reference signals. An example third sub-list of beams may include each parent neighbor level beam associated with the respective primary beam (e.g., a parent level beam in one or more adjacent spatial grouping). In some aspects, the example third sub-list of beams may include each parent neighbor level beam associated with the other primary beams associated with the other reference signals. An example fourth sub-list of beams may include each child neighbor level beam (e.g., a child level beam in one or more adjacent spatial grouping) associated with the respective primary beam and/or each child neighbor level beam associated with the other primary beams associated with the other reference signals. An example fifth sub-list of beams may include all Level 1 beams of the multiple beams included in the UE beam codebook and an example sixth sub-list of beams may include all maximum level beams of the multiple beams. In some aspects, a Level 1 beam may be based at least in part on an absolute value while a maximum level beam may be based at least in part on a relative value. For example, a Level 1 beam may denote a beam assigned a Level 1 hierarchy as specified by a beam hierarchy (e.g., an absolute beam width threshold) and a maximum level beam may be a beam within a spatial grouping with a highest beam hierarchy. Accordingly a maximum level beam may have a lower beam hierarchy relative to Level 1, such as a maximum level beam in a spatial grouping that lacks a Level 1 beam.

In one example, the UE 120 may select, as a beam sweeping subset of beams, the first sub-list of beams, the second sub-list of beams, and the fifth sub-list of beams. To illustrate, the UE 120 may select the first sub-list, the second sub-list, and the fifth sub-list based at least in part on the current UE operating state including at least one of a beam dwell time that satisfies a first dwell time threshold (e.g., associated with a fast motion state), a Doppler factor and/or a Doppler frequency that satisfies a first Doppler threshold (e.g., associated with a high relative change in motion), and/or a UE motion state that satisfies a fast motion threshold. That is, the UE 120 may determine to include a fewer number of beams in the beam sweeping subset (e.g., relative to other UE operating states and/or other beam sweeping subsets) based at least in part on determining that the UE is operating in a fast motion state and that a beam management procedure may be used more frequently as the UE moves locations more rapidly.

As another example, the UE 120 may select, as the beam sweeping subset of beams, the first sub-list of beams, the second sub-list of beams, the third sub-list of beams, the fourth sub-list of beams, and the fifth sub-list of beams. For instance, the UE 120 may select the first sub-list, the second sub-list, the third sub-list, the fourth sub-list, and the fifth sub-list based at least in part on the current UE operating state including at least one of a beam dwell time that satisfies a second dwell time threshold (e.g., associated with a slow motion state), a Doppler factor and/or a Doppler frequency that satisfies a second Doppler threshold (e.g., associated with the slow motion state), and/or a UE motion state that satisfies a slow motion threshold. In some aspects, the UE 120 may select more beams to include in the beam sweeping subset (e.g., relative to the "fast motion" beam sweeping subset of beams) based at least in part on identifying that the UE 120 is changing locations less rapidly relative to the fast motion UE operating state and, subsequently, determining that a selected primary beam may be used for a longer time duration. Accordingly, using more beams in the beam sweeping subset may improve a signal quality of a selected beam and/or reduce a frequency of how often the network node 110 and the UE 120 perform a beam management procedure. Reducing how often the beam management procedure is performed may reduce a delay introduced by performing the beam management procedure.

As yet another example, the UE 120 may select, as the beam sweeping subset of beams, the first sub-list of beams, the second sub-list of beams, the third sub-list of beams, the fourth sub-list of beams, the fifth sub-list of beams, and the sixth sub-list of beams. For instance, the UE 120 may select the first sub-list, the second sub-list, the third sub-list, the fourth sub-list, the fifth sub-list, and the sixth sub-list of beams based at least in part on the current UE operating state including a UE motion state that satisfies a stationary threshold. The UE 120 may select more beams to include in the beam sweeping subset (e.g., relative to the "fast motion" beam sweeping subset of beams and/or the "slow motion" beam sweeping subset of beams) based at least in part on identifying that the UE 120 is stationary and, subsequently, determining that a selected primary beam may be used for a longer time duration. Accordingly, using more beams in the beam sweeping subset of beams may improve a signal quality of a selected beam. Alternatively or additionally, the network node 110 and/or the UE 120 may perform the beam management procedure less frequently based at least in part on the improved signal quality and subsequently reduce a delay introduced by performing the beam management procedure.

As shown by reference number 540, the network node 110 and the UE 120 may perform a beam management procedure. As one example, the network node 110 and the UE 120 may perform any combination of beam management procedures as further described with regard to FIG. 3. In some aspects, the UE 120 may use the beam sweeping subset of beams that are selected based at least in part on the current UE operating state.

As shown by reference number 550, the UE 120 may transmit, and the network node 110 may receive, an indication of a selected beam. For instance, the UE 120 may select a different beam than a current beam based at least in part on the beam management procedure indicating that the different beam has a higher signal quality relative to the current beam. The UE 120 may indicate the different beam based at least in part on an RRC message, a MAC CE, and/or uplink control information (UCI), By dynamically selecting beams that are used in a beam sweeping procedure based at least in part on a current UE operating state, a UE may dynamically change a number of beams and/or a combination of beams in a beam sweeping subset of beams and improve a beam management procedure. For example, the UE may select fewer beams (e.g., relative to the static number of beams) and reduce a delay associated with performing a beam management procedure based at least in part on identifying that the beam management procedure may be performed more frequently (e.g., by identifying that a UE is changing locations rapidly). Alternatively or additionally, the UE may change a combination of beams that enables the UE to select an optimal beam from an entirety of available beams based at least in part on identifying that the beam management procedure may be performed less frequently (e.g., by identifying that the UE is stationary). Dynamically changing a subset of beams based on a UE operating state may enable the UE to optimize a tradeoff between reducing delay associated with performing a beam sweeping procedure and improving a signal quality associated with a selected beam. Optimizing the tradeoff may further reduce recovery errors, improve data throughput, and/or reduce data transfer latencies.

As indicated above, FIG. 5 is provided as an example. Other examples may differ from what is described with regard to FIG. 5.

FIG. 6 is a diagram illustrating an example process 600 performed, for example, by a UE, in accordance with the present disclosure. Example process 600 is an example where the UE (e.g., the UE 120) performs operations associated with beam sweeping based on a UE operating state.

As shown in FIG. 6, in some aspects, process 600 may include performing a beam sweeping procedure that selects a communication beam for communicating in a wireless network, the beam sweeping procedure being based at least in part on a beam sweeping subset of beams that is dynamically selected from a plurality of beams based at least in part on a current UE operating state (block 610). For example, the UE (e.g., using communication manager 140 and/or beam sweeping manager component 708, depicted in FIG. 7) may perform a beam sweeping procedure that selects a communication beam for communicating in a wireless network, the beam sweeping procedure being based at least in part on a beam sweeping subset of beams that is dynamically selected from a plurality of beams based at least in part on a current UE operating state, as described above.

As further shown in FIG. 6, in some aspects, process 600 may include communicating in the wireless network based at least in part on the communication beam that is selected based at least in part on the beam sweeping procedure (block 620). For example, the UE (e.g., using communication manager 140 and/or beam sweeping manager component 708, depicted in FIG. 7) may communicate in the wireless network based at least in part on the communication beam that is selected based at least in part on the beam sweeping procedure, as described above.

Process 600 may include additional aspects, such as any single aspect or any combination of aspects described below and/or in connection with one or more other processes described elsewhere herein.

In a first aspect, the current UE operating state includes at least one of a UE motion state, a Doppler factor, or a beam dwell time.

In a second aspect, process 600 includes determining the current UE operating state, and selecting the beam sweeping subset of beams from the plurality of beams based at least in part on the current UE operating state.

In a third aspect, determining the current UE operating state includes identifying a current UE motion state as being one of a stationary state that is based at least in part on a stationary threshold, a first motion state that is based at least in part on a slow motion threshold, or a second motion state that is based at least in part on a fast motion threshold.

In a fourth aspect, the plurality of beams are partitioned into one or more spatial groupings of beams, and process 600 includes selecting the beam sweeping subset of beams based at least in part on the current UE operating state and the one or more spatial groupings of beams.

In a fifth aspect, process 600 includes selecting, from the plurality of beams, a respective primary beam for each SSB of a plurality of SSBs based at least in part on a signal metric associated with the respective primary beam that indicates that the respective primary beam has a higher signal quality relative to other beams of the plurality of beams.

In a sixth aspect, the beam sweeping subset of beams is one of multiple beam sweeping subsets of beams, and process 600 includes determining, as the multiple beam sweeping subsets of beams, a respective beam sweeping subset of beams for each SSB of the plurality of SSBs based at least in part on the respective primary beam associated with the SSB.

In a seventh aspect, determining the respective beam sweeping subset of beams for each SSB is based at least in part on a baseline beam hierarchy level associated with the respective primary beam.

In an eighth aspect, determining the respective beam sweeping subset of beams for each SSB is based at least in part on at least one sub-list of beams associated with the plurality of beams, the at least one sub-list of beams include at least one of a first sub-list of beams that includes the respective primary beam, a second sub-list of beams that includes each parent level beam associated with the respective primary beam, each neighbor level beam associated with the respective primary beam, and each child level beam associated with the respective primary beam, a third sub-list of beams that includes each parent neighbor level beam associated with the respective primary beam, a fourth sub-list of beams that includes each child neighbor level beam associated with the respective primary beam, a fifth sub-list of beams that includes all level 1 beams of the plurality of beams, or a sixth sub-list of beams that includes all maximum level beams of the plurality of beams.

In a ninth aspect, process 600 includes selecting, as the respective beam sweeping subset of beams, the first sub-list of beams, the second sub-list of beams, and the fifth sub-list of beams based at least in part on the current UE operating state.

In a tenth aspect, the current UE operating state includes a beam dwell time that satisfies a first dwell time threshold, a Doppler factor that satisfies a first Doppler threshold, and a UE motion state that satisfies a fast motion threshold.

In an eleventh aspect, process 600 includes selecting, as the respective beam sweeping subset of beams, the first sub-list of beams, the second sub-list of beams, the third sub-list of beams, the fourth sub-list of beams, and the fifth sub-list of beams based at least in part on the current UE operating state.

In a twelfth aspect, the current UE operating state includes a beam dwell time that satisfies a second dwell time threshold, a Doppler factor that satisfies a second Doppler threshold, and a UE motion state that satisfies a slow motion threshold.

In a thirteenth aspect, process 600 includes selecting, as the respective beam sweeping subset of beams, the first sub-list of beams, the second sub-list of beams, the third sub-list of beams, the fourth sub-list of beams, the fifth sub-list of beams, and the sixth sub-list of beams based at least in part on the current UE operating state.

In a fourteenth aspect, the current UE operating state includes a UE motion state that satisfies a stationary threshold.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
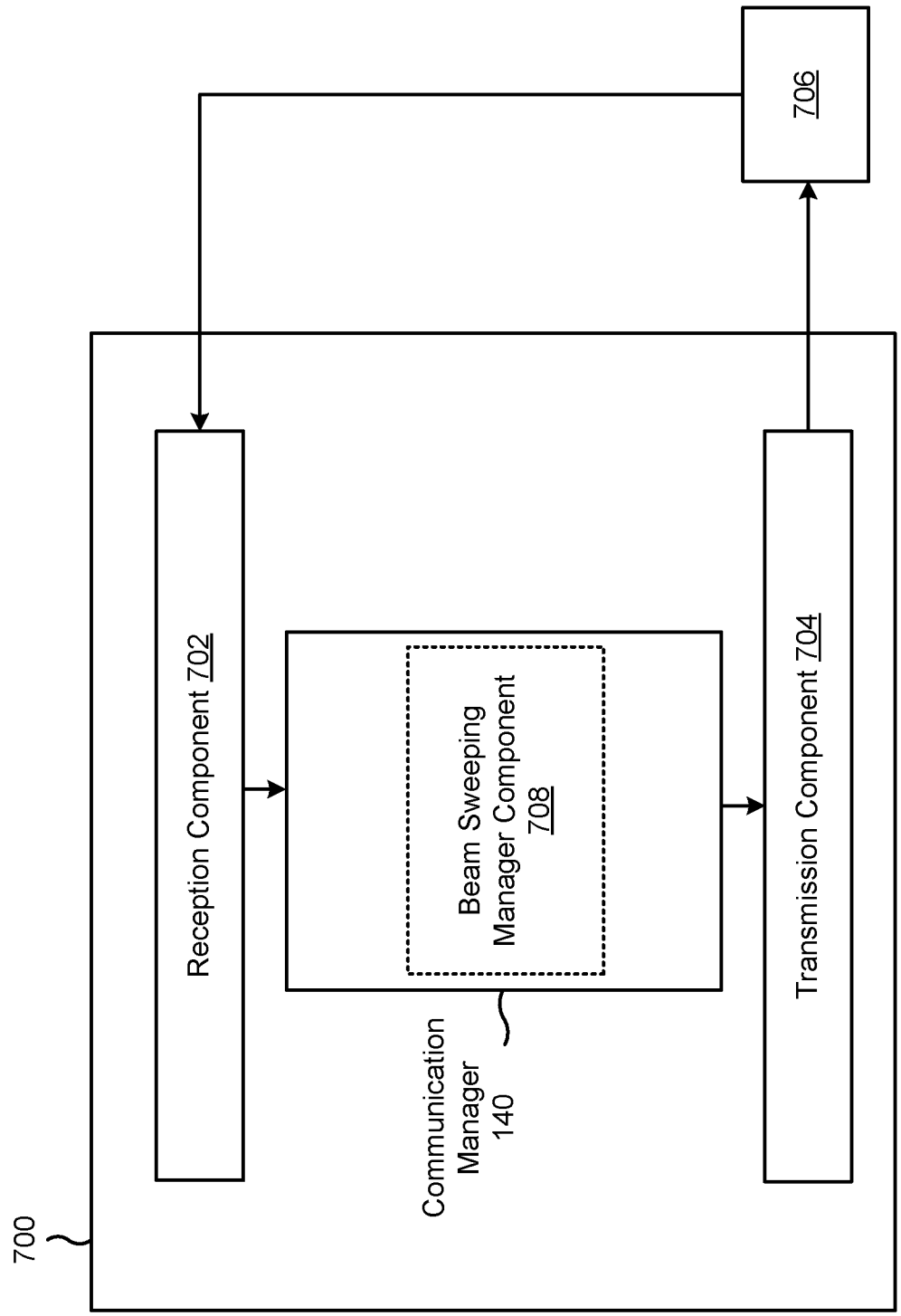
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a beam sweeping manager component 708, among other examples.

In some aspects, the apparatus 700 may be configured to perform one or more operations described herein in connection with FIGS. 5 and 6. Additionally, or alternatively, the apparatus 700 may be configured to perform one or more processes described herein, such as process 600 of FIG. 6, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The beam sweeping manager component 708 may perform a beam sweeping procedure that selects a communication beam for communicating in a wireless network, the beam sweeping procedure being based at least in part on a beam sweeping subset of beams that is dynamically selected from a plurality of beams based at least in part on a current UE operating state. The beam sweeping manager component 708 may communicate in the wireless network based at least in part on the communication beam that is selected based at least in part on the beam sweeping procedure.

The beam sweeping manager component 708 may determine the current UE operating state. Alternatively or additionally, the beam sweeping manager component 708 may select the beam sweeping subset of beams from the plurality of beams based at least in part on the current UE operating state. The beam sweeping manager component 708 may select, from the plurality of beams, a respective primary beam for each SSB of a plurality of SSBs based at least in part on a signal metric associated with the respective primary beam that indicates that the respective primary beam has a higher signal quality relative to other beams of the plurality of beams.

In some aspects, the beam sweeping manager component 708 may select, as the respective beam sweeping subset of beams, the first sub-list of beams, the second sub-list of beams, and the fifth sub-list of beams based at least in part on the current UE operating state. Alternatively or additionally, the beam sweeping manager component 708 may select, as the respective beam sweeping subset of beams, the first sub-list of beams, the second sub-list of beams, the third sub-list of beams, the fourth sub-list of beams, and the fifth sub-list of beams based at least in part on the current UE operating state. At times, the beam sweeping manager component 708 may select, as the respective beam sweeping subset of beams, the first sub-list of beams, the second sub-list of beams, the third sub-list of beams, the fourth sub-list of beams, the fifth sub-list of beams, and the sixth sub-list of beams based at least in part on the current UE operating state.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by an apparatus of a user equipment (UE), comprising: performing a beam sweeping procedure that selects a communication beam for communicating in a wireless network, the beam sweeping procedure being based at least in part on a beam sweeping subset of beams that is dynamically selected from a plurality of beams based at least in part on a current UE operating state; and communicating in the wireless network based at least in part on the communication beam that is selected based at least in part on the beam sweeping procedure.

Aspect 2: The method of Aspect 1, wherein the current UE operating state comprises at least one of: a UE motion state, a Doppler factor, or a beam dwell time.

Aspect 3: The method of Aspect 1 or Aspect 2, further comprising: determining the current UE operating state; and selecting the beam sweeping subset of beams from the plurality of beams based at least in part on the current UE operating state.

Aspect 4: The method of any one of Aspects 1-3, wherein determining the current UE operating state comprises: identifying a current UE motion state as being one of: a stationary state that is based at least in part on a stationary threshold, a first motion state that is based at least in part on a slow motion threshold, or a second motion state that is based at least in part on a fast motion threshold.

Aspect 5: The method of any one of Aspects 1-4, wherein the plurality of beams are partitioned into one or more spatial groupings of beams, and the method further comprises: selecting the beam sweeping subset of beams based at least in part on the current UE operating state and the one or more spatial groupings of beams.

Aspect 6: The method of any one of Aspects 1-5, further comprising: selecting, from the plurality of beams, a respective primary beam for each synchronization signal block (SSB) of a plurality of SSBs based at least in part on a signal metric associated with the respective primary beam that indicates that the respective primary beam has a higher signal quality relative to other beams of the plurality of beams.

Aspect 7: The method of Aspect 6, wherein the beam sweeping subset of beams is one of multiple beam sweeping subsets of beams, and the method further comprises: determining, as the multiple beam sweeping subsets of beams, a respective beam sweeping subset of beams for each SSB of the plurality of SSBs based at least in part on the respective primary beam associated with the SSB.

Aspect 8: The method of Aspect 7, wherein determining the respective beam sweeping subset of beams for each SSB is based at least in part on a baseline beam hierarchy level associated with the respective primary beam.

Aspect 9: The method of Aspect 8, wherein determining the respective beam sweeping subset of beams for each SSB is based at least in part on at least one sub-list of beams associated with the plurality of beams, the at least one sub-list of beams comprising at least one of: a first sub-list of beams that comprises the respective primary beam, a second sub-list of beams that comprises each parent level beam associated with the respective primary beam, each neighbor level beam associated with the respective primary beam, and each child level beam associated with the respective primary beam, a third sub-list of beams that comprises each parent neighbor level beam associated with the respective primary beam, a fourth sub-list of beams that comprises each child neighbor level beam associated with the respective primary beam, a fifth sub-list of beams that includes all level 1 beams of the plurality of beams, or a sixth sub-list of beams that includes all maximum level beams of the plurality of beams.

Aspect 10: The method of Aspect 9, further comprising: selecting, as the respective beam sweeping subset of beams, the first sub-list of beams, the second sub-list of beams, and the fifth sub-list of beams based at least in part on the current UE operating state.

Aspect 11: The method of Aspect 10, wherein the current UE operating state comprises: a beam dwell time that satisfies a first dwell time threshold, a Doppler factor that satisfies a first Doppler threshold, and a UE motion state that satisfies a fast motion threshold.

Aspect 12: The method of Aspect 9, further comprising: selecting, as the respective beam sweeping subset of beams, the first sub-list of beams, the second sub-list of beams, the third sub-list of beams, the fourth sub-list of beams, and the fifth sub-list of beams based at least in part on the current UE operating state.

Aspect 13: The method of Aspect 12, wherein the current UE operating state comprises: a beam dwell time that satisfies a second dwell time threshold, a Doppler factor that satisfies a second Doppler threshold, and a UE motion state that satisfies a slow motion threshold.

Aspect 14: The method of Aspect 9, further comprising: selecting, as the respective beam sweeping subset of beams, the first sub-list of beams, the second sub-list of beams, the third sub-list of beams, the fourth sub-list of beams, the fifth sub-list of beams, and the sixth sub-list of beams based at least in part on the current UE operating state.

Aspect 15: The method of Aspect 14, wherein the current UE operating state comprises: a UE motion state that satisfies a stationary threshold.

Aspect 16: An apparatus for wireless communication at a device, comprising a processor; memory coupled with the processor; and instructions stored in the memory and executable by the processor to cause the apparatus to perform the method of one or more of Aspects 1-15.

Aspect 17: A device for wireless communication, comprising a memory and one or more processors coupled to the memory, the one or more processors configured to perform the method of one or more of Aspects 1-15.

Aspect 18: An apparatus for wireless communication, comprising at least one means for performing the method of one or more of Aspects 1-15.

Aspect 19: A non-transitory computer-readable medium storing code for wireless communication, the code comprising instructions executable by a processor to perform the method of one or more of Aspects 1-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      select, from a plurality of beams, a respective primary beam for each synchronization signal block (SSB) of a plurality of SSBs based at least in part on a signal metric associated with the respective primary beam, the respective primary beam associated with a beam sweeping subset of beams of the plurality of beams;
      perform a beam sweeping procedure that selects a communication beam for communicating in a wireless network, the beam sweeping procedure being based at least in part on a beam sweeping subset of beams that is dynamically selected from the plurality of beams based at least in part on a current UE operating state, the plurality of beams comprising multiple beam sweeping subsets of beams, wherein each subset of beams of the multiple beam sweeping subsets of beams has a primary beam that is associated with a SSB of the plurality of SSBs, and wherein the beam sweeping subset of beams is selected based at least in part on a signal metric associated with the primary beam of the beam sweeping subset of beams; and
      communicate in the wireless network based at least in part on the communication beam that is selected based at least in part on the beam sweeping procedure.

2. The apparatus of claim 1,
   wherein the current UE operating state comprises at least one of:
      a UE motion state,
      a Doppler factor, or
      a beam dwell time.

3. The apparatus of claim 1,
   wherein the one or more processors are further configured to:
      determine the current UE operating state; and
      select the beam sweeping subset of beams from the plurality of beams based at least in part on the current UE operating state.

4. The apparatus of claim 3,
   wherein the one or more processors, to determine the current UE operating state, are configured to:
      identify a current UE motion state as being one of:
         a stationary state that is based at least in part on a stationary threshold,
         a first motion state that is based at least in part on a slow motion threshold, or
         a second motion state that is based at least in part on a fast motion threshold.

5. The apparatus of claim 3,
   wherein the one or more processors are further configured to:
      select the beam sweeping subset of beams based at least in part on the current UE operating state and one or more spatial groupings of beams.

6. The apparatus of claim 1,
   wherein the signal metric associated with the respective primary beam indicates that the respective primary beam has a higher signal quality relative to other beams of the plurality of beams.

7. The apparatus of claim 6,
   wherein the beam sweeping subset of beams is one of multiple beam sweeping subsets of beams, and the one or more processors are further configured to:
      determine, as the multiple beam sweeping subsets of beams, a respective beam sweeping subset of beams for each SSB of the plurality of SSBs based at least in part on the respective primary beam associated with the SSB.

8. The apparatus of claim 6,
   wherein the one or more processors, are configured to:
      determine a respective beam sweeping subset of beams for each SSB based at least in part on a baseline beam hierarchy level associated with the respective primary beam.

9. The apparatus of claim 8,
wherein the one or more processors, to determine the respective beam sweeping subset of beams for each SSB, are further configured to:
  determine the respective beam sweeping subset of beams based at least in part on at least one sub-list of beams, the at least one sub-list of beams comprising at least one of:
    a first sub-list of beams that comprises the respective primary beam,
    a second sub-list of beams that comprises each parent level beam associated with the respective primary beam, each neighbor level beam associated with the respective primary beam, and each child level beam associated with the respective primary beam,
    a third sub-list of beams that comprises each parent neighbor level beam associated with the respective primary beam,
    a fourth sub-list of beams that comprises each child neighbor level beam associated with the respective primary beam,
    a fifth sub-list of beams that includes all level 1 beams of the plurality of beams, or
    a sixth sub-list of beams that includes all maximum level beams of the plurality of beams.

10. The apparatus of claim 9,
wherein the one or more processors are further configured to:
  select, as the respective beam sweeping subset of beams, the first sub-list of beams, the second sub-list of beams, and the fifth sub-list of beams based at least in part on the current UE operating state.

11. The apparatus of claim 10,
wherein the current UE operating state comprises:
  a beam dwell time that satisfies a first dwell time threshold,
  a Doppler factor that satisfies a first Doppler threshold, and
  a UE motion state that satisfies a fast motion threshold.

12. A method of wireless communication performed by an apparatus of a user equipment (UE), comprising:
  selecting, from a plurality of beams, a respective primary beam for each synchronization signal block (SSB) of a plurality of SSBs based at least in part on a signal metric associated with the respective primary beam, the respective primary beam associated with a beam sweeping subset of beams of the plurality of beams;
  performing a beam sweeping procedure that selects a communication beam for communicating in a wireless network, the beam sweeping procedure being based at least in part on a beam sweeping subset of beams that is dynamically selected from the plurality of beams based at least in part on a current UE operating state, the plurality of beams comprising multiple beam sweeping subsets of beams, wherein each subset of beams of the multiple beam sweeping subsets of beams has a primary beam that is associated with a SSB of the plurality of SSBs, and wherein the beam sweeping subset of beams is selected based at least in part on a signal metric associated with the primary beam of the beam sweeping subset of beams; and
  communicating in the wireless network based at least in part on the communication beam that is selected based at least in part on the beam sweeping procedure.

13. The method of claim 12, further comprising:
  determining the current UE operating state; and
  selecting the beam sweeping subset of beams from the plurality of beams based at least in part on the current UE operating state.

14. The method of claim 12,
wherein the plurality of beams are partitioned into one or more spatial groupings of beams, and the method further comprises:
  selecting the beam sweeping subset of beams based at least in part on the current UE operating state and the one or more spatial groupings of beams.

15. The method of claim 12,
wherein the signal metric associated with the respective primary beam indicates that the respective primary beam has a higher signal quality relative to other beams of the plurality of beams.

16. The method of claim 15,
wherein the beam sweeping subset of beams is one of multiple beam sweeping subsets of beams, and the method further comprises:
  determining, as the multiple beam sweeping subsets of beams, a respective beam sweeping subset of beams for each SSB of the plurality of SSBs based at least in part on the respective primary beam associated with the SSB.

17. The method of claim 16,
wherein determining the respective beam sweeping subset of beams for each SSB is based at least in part on a baseline beam hierarchy level associated with the respective primary beam.

18. The method of claim 16,
wherein determining the respective beam sweeping subset of beams for each SSB is based at least in part on at least one sub-list of beams associated with the plurality of beams, the at least one sub-list of beams comprising at least one of:
  a first sub-list of beams that comprises the respective primary beam,
  a second sub-list of beams that comprises each parent level beam associated with the respective primary beam, each neighbor level beam associated with the respective primary beam, and each child level beam associated with the respective primary beam,
  a third sub-list of beams that comprises each parent neighbor level beam associated with the respective primary beam,
  a fourth sub-list of beams that comprises each child neighbor level beam associated with the respective primary beam,
  a fifth sub-list of beams that includes all level 1 beams of the plurality of beams, or
  a sixth sub-list of beams that includes all maximum level beams of the plurality of beams.

19. The method of claim 18, further comprising:
  selecting, as the respective beam sweeping subset of beams, the first sub-list of beams, the second sub-list of beams, the third sub-list of beams, the fourth sub-list of beams, and the fifth sub-list of beams based at least in part on the current UE operating state.

20. The method of claim 19,
wherein the current UE operating state comprises:
  a beam dwell time that satisfies a second dwell time threshold,
  a Doppler factor that satisfies a second Doppler threshold, and
  a UE motion state that satisfies a slow motion threshold.

21. The method of claim 18, further comprising:
selecting, as the respective beam sweeping subset of beams, the first sub-list of beams, the second sub-list of beams, the third sub-list of beams, the fourth sub-list of beams, the fifth sub-list of beams, and the sixth sub-list of beams based at least in part on the current UE operating state.

22. The method of claim 21,
wherein the current UE operating state comprises:
a UE motion state that satisfies a stationary threshold.

23. An apparatus for wireless communication, comprising:
means for selecting, from a plurality of beams, a respective primary beam for each synchronization signal block (SSB) of a plurality of SSBs based at least in part on a signal metric associated with the respective primary beam, the respective primary beam associated with a beam sweeping subset of beams of the plurality of beams;
means for performing a beam sweeping procedure that selects a communication beam for communicating in a wireless network, the beam sweeping procedure being based at least in part on a beam sweeping subset of beams that is dynamically selected from the plurality of beams based at least in part on a current user equipment (UE) operating state, the plurality of beams comprising multiple beam sweeping subsets of beams, wherein each subset of beams of the multiple beam sweeping subsets of beams has a primary beam that is associated with a SSB of the plurality of SSBs, and wherein the beam sweeping subset of beams is selected based at least in part on a signal metric associated with the primary beam of the beam sweeping subset of beams; and
means for communicating in the wireless network based at least in part on the communication beam that is selected based at least in part on the beam sweeping procedure.

24. The apparatus of claim 23, further comprising:
means for determining the current UE operating state; and
means for selecting the beam sweeping subset of beams from the plurality of beams based at least in part on the current UE operating state.

25. The apparatus of claim 24,
wherein the means for determining the current UE operating state comprises:
means for identifying a current UE motion state as being one of:
a stationary state that is based at least in part on a stationary threshold,
a first motion state that is based at least in part on a slow motion threshold, or
a second motion state that is based at least in part on a fast motion threshold.

26. The apparatus of claim 24,
wherein the means for selecting the beam sweeping subset of beams further comprises:
means for selecting the beam sweeping subset of beams based at least in part on the current UE operating state and one or more spatial groupings of beams.

27. A non-transitory computer-readable medium storing a set of instructions for wireless communication, the set of instructions comprising:
one or more instructions that, when executed by one or more processors of an apparatus, cause the apparatus to:
select, from a plurality of beams, a respective primary beam for each synchronization signal block (SSB) of a plurality of SSBs based at least in part on a signal metric associated with the respective primary beam, the respective primary beam associated with a beam sweeping subset of beams of the plurality of beams;
perform a beam sweeping procedure that selects a communication beam for communicating in a wireless network, the beam sweeping procedure being based at least in part on a beam sweeping subset of beams that is dynamically selected from the plurality of beams based at least in part on a current user equipment (UE) operating state, the plurality of beams comprising multiple beam sweeping subsets of beams, wherein each subset of beams of the multiple beam sweeping subsets of beams has a primary beam that is associated with a SSB of the plurality of SSBs, and wherein the beam sweeping subset of beams is selected based at least in part on a signal metric associated with the primary beam of the beam sweeping subset of beams; and
communicate in the wireless network based at least in part on the communication beam that is selected based at least in part on the beam sweeping procedure.

28. The non-transitory computer-readable medium of claim 27,
wherein the one or more instructions further cause the apparatus to:
determine the current UE operating state; and
select the beam sweeping subset of beams from the plurality of beams based at least in part on the current UE operating state.

29. The non-transitory computer-readable medium of claim 27,
wherein the signal metric associated with the respective primary beam indicates that the respective primary beam has a higher signal quality relative to other beams of the plurality of beams.

30. The non-transitory computer-readable medium of claim 29,
wherein the one or more instructions cause the apparatus to:
determine a respective beam sweeping subset of beams for each SSB based at least in part on a baseline beam hierarchy level associated with the respective primary beam.

* * * * *